(12) United States Patent
Suginohara

(10) Patent No.: US 10,209,674 B2
(45) Date of Patent: Feb. 19, 2019

(54) FLOATING IMAGE DISPLAY DEVICE

(71) Applicant: Mitsubishi Electric Corporation, Tokyo (JP)

(72) Inventor: Hidetsugu Suginohara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 203 days.

(21) Appl. No.: 15/411,333

(22) Filed: Jan. 20, 2017

(65) Prior Publication Data

US 2017/0227928 A1 Aug. 10, 2017

(30) Foreign Application Priority Data

Feb. 8, 2016 (JP) ................................. 2016-021486

(51) Int. Cl.
*G03H 1/22* (2006.01)
*G02B 27/10* (2006.01)
(Continued)

(52) U.S. Cl.
CPC ......... *G03H 1/2202* (2013.01); *G02B 27/106* (2013.01); *G02B 27/2292* (2013.01);
(Continued)

(58) Field of Classification Search
CPC .. G02B 27/106; G02B 27/2292; G02B 5/124; G03H 1/0005; G03H 1/2202;
(Continued)

(56) References Cited

U.S. PATENT DOCUMENTS 5,886,818 A * 3/1999 Summer ................ G02B 27/22
359/478
6,094,283 A * 7/2000 Preston .................... G03H 1/28
345/8

(Continued)

FOREIGN PATENT DOCUMENTS

JP 2006-254275 A 9/2006
JP 2006-293183 A 10/2006
(Continued)

OTHER PUBLICATIONS

"Mitsubishi Electric Develops 'Aerial Display' that Projects Large Images Midair", For Immediate Release No. 3001, Mitsubishi Electric Corporation Public Relations Division, Feb. 16, 2016, pp. 1-2.

*Primary Examiner* — Peter D Le
(74) *Attorney, Agent, or Firm* — Birch, Stewart, Kolasch & Birch, LLP

(57) ABSTRACT

A floating image display device includes an image display unit that displays a display image based on a first image signal, a floating-image-formation optical system that forms an image in air as a floating image from the display image, a guide image display unit that displays a guide image based on a second image signal nearby the floating image to be visually recognized on the same plane as the floating image as viewed from a viewer, and an image control unit that supplies the first image signal and the second image signal respectively to the image display unit and the guide image display unit. The image control unit supplies an image signal as the second image signal to the guide image display unit after the image signal undergoes at least one of a process of adding blurring, a process of lowering luminance and a process of lowering contrast.

8 Claims, 10 Drawing Sheets

(51) Int. Cl.
*G03H 1/00* (2006.01)
*G02B 27/22* (2018.01)
*G02B 5/124* (2006.01)

(52) U.S. Cl.
CPC ........... *G03H 1/0005* (2013.01); *G02B 5/124* (2013.01); *G03H 2001/2231* (2013.01); *G03H 2223/24* (2013.01); *G03H 2226/05* (2013.01); *G03H 2240/40* (2013.01)

(58) Field of Classification Search
CPC ....... G03H 2001/2231; G03H 2223/24; G03H 2226/05; G03H 2240/40
See application file for complete search history.

(56) References Cited

U.S. PATENT DOCUMENTS

| | | | |
|---|---|---|---|
| 2002/0101657 A1* | 8/2002 | Min | G02B 5/32 359/462 |
| 2004/0085260 A1* | 5/2004 | McDavid, III | G03H 1/0005 345/7 |
| 2006/0215062 A1 | 9/2006 | Hirayama | |
| 2006/0274271 A1* | 12/2006 | Monch | G02B 5/32 353/10 |
| 2008/0030428 A1 | 2/2008 | Tomisawa et al. | |
| 2008/0291269 A1* | 11/2008 | Hong | H04N 13/156 348/51 |
| 2009/0323024 A1* | 12/2009 | Dike | G02B 27/0101 353/10 |
| 2010/0110384 A1 | 5/2010 | Maekawa | |
| 2010/0177402 A1 | 7/2010 | Maekawa | |
| 2010/0238527 A1* | 9/2010 | Govil | G03H 1/2294 359/9 |
| 2011/0181949 A1* | 7/2011 | Hashikawa | G02B 17/006 359/463 |
| 2011/0249087 A1* | 10/2011 | Tsang | G03H 1/2294 348/40 |
| 2013/0009862 A1* | 1/2013 | Chan | G02B 27/2292 345/156 |
| 2015/0036222 A1* | 2/2015 | Mihara | A63H 33/22 359/630 |
| 2015/0304642 A1* | 10/2015 | Kim | G03H 1/2202 348/40 |
| 2016/0219260 A1* | 7/2016 | Sato | H04N 13/0402 13/402 |
| 2017/0099480 A1* | 4/2017 | Kaneda | G02B 5/124 |
| 2017/0139375 A1* | 5/2017 | Chung | G03H 1/0005 |
| 2017/0220001 A1* | 8/2017 | Watanabe | G03H 1/08 |
| 2018/0252934 A1* | 9/2018 | Kim | G02B 27/2292 |

FOREIGN PATENT DOCUMENTS

| | | |
|---|---|---|
| JP | 2008-287262 A | 11/2008 |
| JP | 2009-25776 A | 2/2009 |
| JP | 2009-251141 A | 10/2009 |
| JP | 2009-276698 A | 11/2009 |
| JP | 2010-224292 A | 10/2010 |
| JP | 2012-128454 A | 7/2012 |
| JP | 2014-178652 A | 9/2014 |
| WO | WO 2006/035816 A1 | 4/2006 |
| WO | WO 2008/123500 A1 | 10/2008 |

* cited by examiner

11

18

GUIDE IMAGE REGION   FLOATING IMAGE REGION   GUIDE IMAGE REGION

FLOATING IMAGE DISPLAY DEVICE

BACKGROUND OF THE INVENTION

1. Field of the Invention

The present invention relates to a floating image display device for displaying a floating image in the air where there are no display elements.

2. Description of the Related Art

There has been devised a technology for projecting a display image displayed on a flat panel display or the like onto a space in the air where there are no display elements. For example, Japanese Patent Application Publication No. 2009-276698 (Patent Document 1) discloses a technology that employs a dihedral corner reflector array formed by arranging a great number of dihedral corner reflectors on a plane, and thereby forms a floating image based on the display image in a space at a position plane-symmetrical with respect to the dihedral corner reflector array to display the floating image as a real image in the air.

Further, Japanese Patent Application Publication No. 2009-25776 (Patent Document 2) discloses a technology that employs a half mirror and a retroreflective sheet, and thereby forms a floating image based on the display image in a space at a position plane-symmetrical with respect to the half mirror to display the floating image as a real image in the air.

By using these technologies, a floating image as a real image based on the display image can be displayed in the air where there are no display elements; however, there is a problem in that a position where the floating image is displayed is hard to recognize for a viewer viewing the floating image. In our daily lives, it is easy to focus our eyes on an actual object; however, it is not easy for the viewer to focus his/her eyes on the floating image since the floating image is the real image formed at the position (in the air) where no actual object exists. If the viewer's eyes are focused on an actual object (e.g., a dihedral corner reflector array, a half mirror or a retroreflective sheet) existing in the direction of the viewer's line of vision, the viewer feels that the floating image is displayed not in the air but on the actual object existing in the direction of the line of vision.

SUMMARY OF THE INVENTION

An object of the present invention is to provide a floating image display device that enables a viewer to visually recognize a floating image as an image existing at a position where a real image is displayed.

The floating image display device according to the present invention includes an image display unit that displays a display image based on a first image signal, a floating-image-formation optical system that forms an image in air as the floating image from the display image, a guide image display unit that displays a guide image based on a second image signal nearby the floating image so that the guide image is visually recognized on a same plane as the floating image as viewed from the viewer, and an image control unit that supplies the first image signal to the image display unit and supplies the second image signal to the guide image display unit. The image control unit supplies an image signal as the second image signal to the guide image display unit after the image signal undergoes at least one of a process of adding substantially a same level of blurring as blurring of the floating image to the guide image, a process of lowering luminance to substantially a same level as luminance of the floating image and a process of lowering contrast to substantially a same level as contrast of the floating image.

According to the present invention, it is easy for the viewer to focus his/her eyes on the floating image displayed in the air and it is possible for the viewer to visually recognize the floating image correctly at the originally intended display position.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
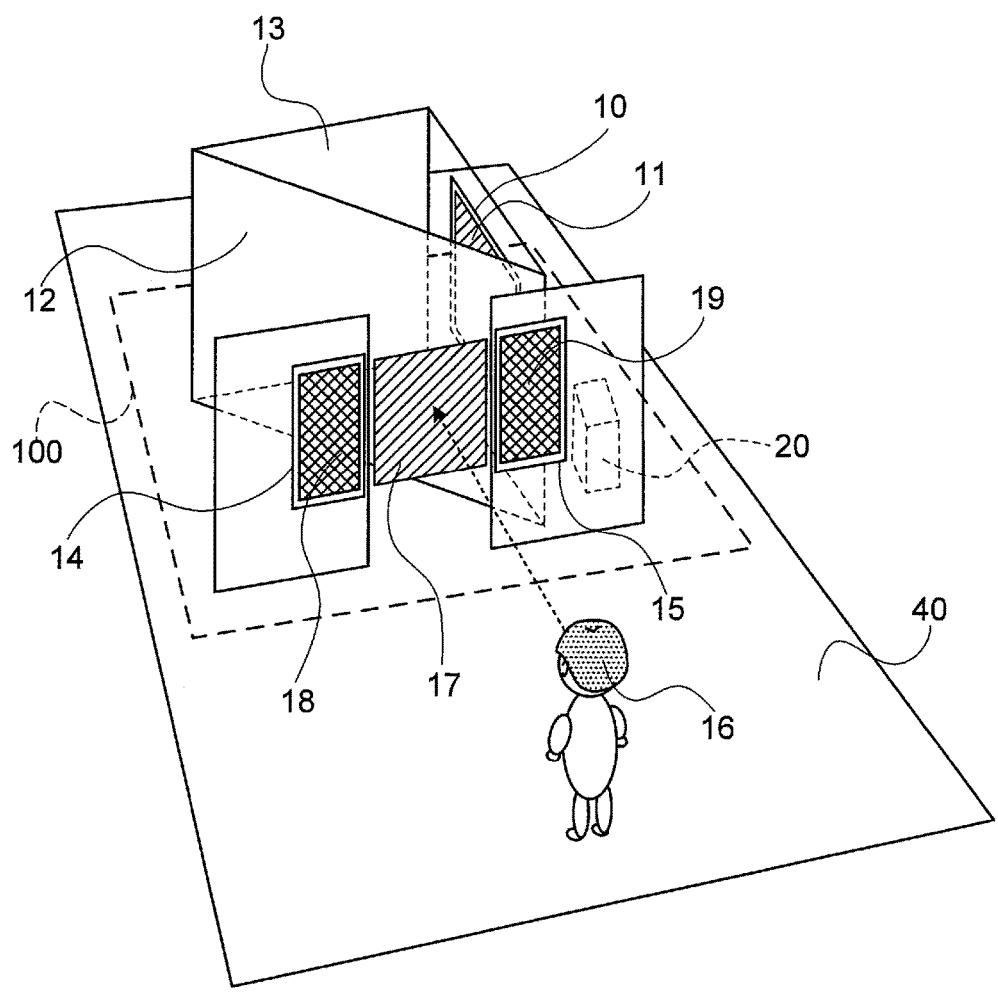
FIG. 1 is a bird's-eye view schematically showing the configuration of a floating image display device according to a first embodiment.

FIG. 1 is a bird's-eye view schematically showing the configuration of a floating image display device 100 according to a first embodiment of the present invention. In FIG. 1, the floating image display device 100 includes an image display unit 10, a beam splitter 12, a retroreflective sheet 13, a left guide image display unit 14 and a right guide image display unit 15. These are components stood orthogonally to a floor surface 40 serving as a reference plane. The image display unit 10 being orthogonal to the floor surface 40 means that a display surface of the image display unit 10 is a surface at an angle of approximately 90 degrees with respect to the floor surface 40. The beam splitter 12 being orthogonal to the floor surface 40 means that surfaces (a light reflection/incidence surface and a light exit surface) of the beam splitter 12 are surfaces at angles of approximately 90 degrees with respect to the floor surface 40. The retroreflective sheet 13 being orthogonal to the floor surface 40 means that a surface of the retroreflective sheet 13 is a surface at an angle of approximately 90 degrees with respect to the floor surface 40. The left guide image display unit 14 being orthogonal to the floor surface 40 means that a display surface of the left guide image display unit 14 is a surface at an angle of approximately 90 degrees with respect to the floor surface 40. The right guide image display unit 15 being orthogonal to the floor surface 40 means that a display surface of the right guide image display unit 15 is a surface at an angle of approximately 90 degrees with respect to the floor surface 40.

The floating image display device 100 further includes an image control unit 20. A display image 11 displayed on the image display unit 10 is projected as a floating image 17 in a space between the left guide image display unit 14 and the right guide image display unit 15 by a floating-image-formation optical system made up of the beam splitter 12 and the retroreflective sheet 13. On the left guide image display unit 14 and the right guide image display unit 15 situated to the left and right of the floating image 17, a left guide image 18 and a right guide image 19 are displayed as guide images, respectively. The floating image 17, the left guide image 18 and the right guide image 19 are arranged on substantially the same plane. As shown in FIG. 1, a viewer 16 can view the floating image 17, the left guide image 18 and the right guide image 19 at the same time.

Figure 12:
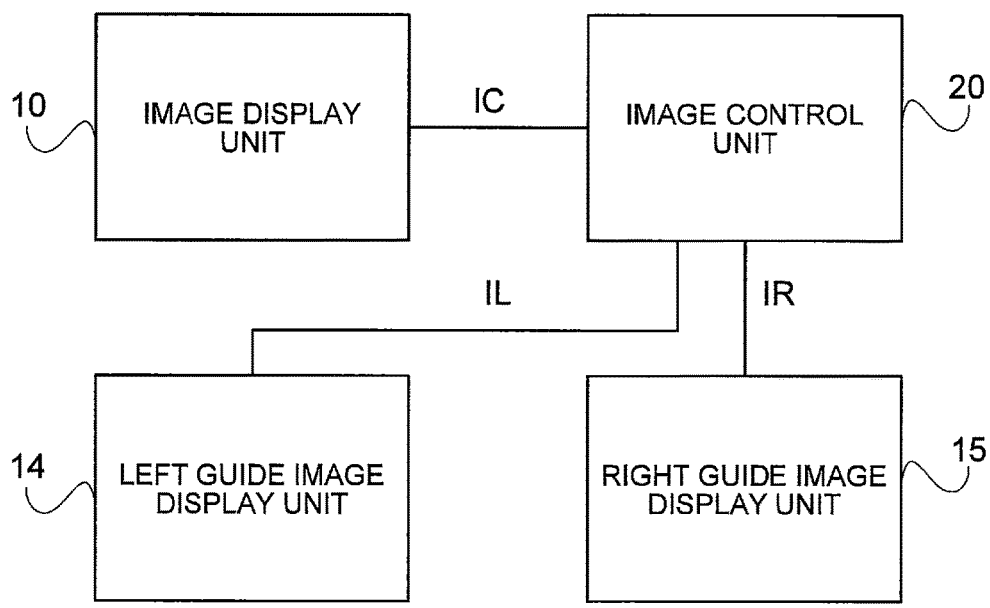
FIG. 12 is a block diagram showing the general configuration of the floating image display device shown in FIG. 1.

FIG. 12 is a block diagram showing the general configuration of the floating image display device 100. As shown in FIG. 12, the image control unit 20 outputs an image signal $I_C$ of the display image 11, an image signal $I_L$ of the left guide image 18 and an image signal $I_R$ of the right guide image 19 to the image display unit 10, the left guide image display unit 14 and the right guide image display unit 15, respectively.

Figure 2:
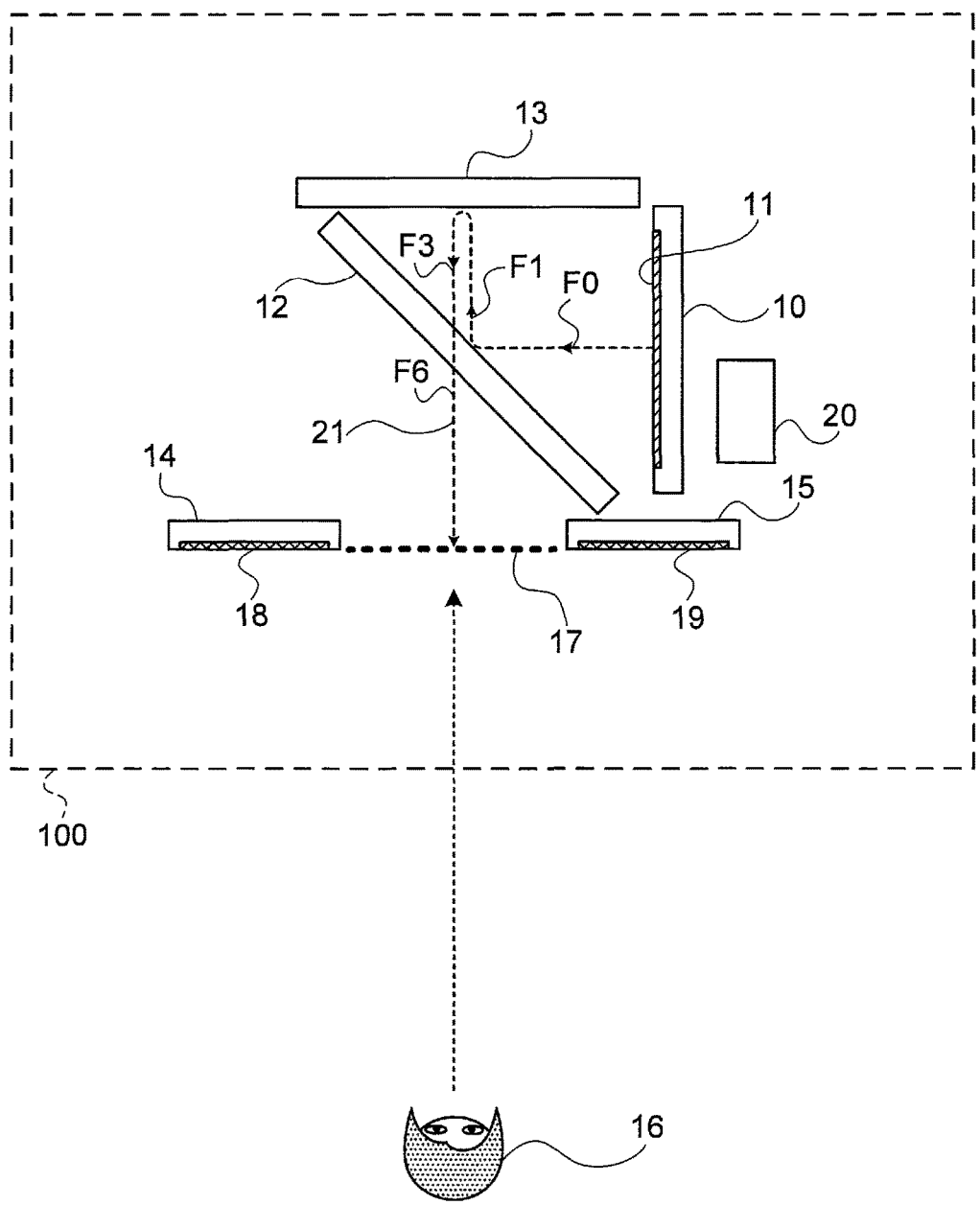
FIG. 2 is a top view schematically showing the configuration of the floating image display device according to the first embodiment.
Figure 13:
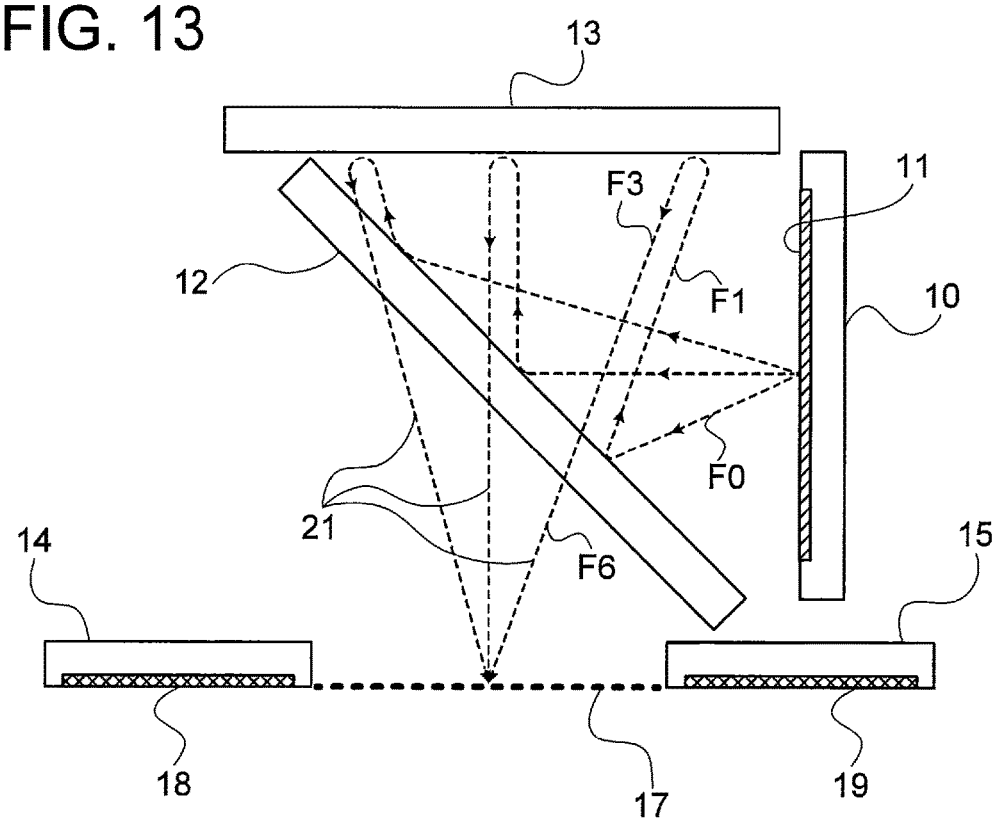
FIG. 13 is an enlarged top view showing the configuration of the optical system of the floating image display device shown in FIG. 2 and its principal optical paths.

FIG. 2 is a top view schematically showing the configuration of the floating image display device 100 according to the first embodiment. Since the configuration shown in FIG. 2 is equivalent to the configuration shown in FIG. 1, reference characters identical with those shown in FIG. 1 are assigned to the components shown in FIG. 2 and repeated explanation thereof is omitted here. FIG. 2 illustrates the positional relationship among the components of the floating image display device 100. FIG. 13 is an enlarged top view showing the configuration of the optical system of the floating image display device 100 shown in FIG. 2 and its principal optical paths 21.

In the following description, details of the configuration of the floating image display device 100 will be described with reference to FIG. 1, FIG. 2, FIG. 12 and FIG. 13.

The image display unit 10 displays the display image by using a means with light emission. The image display unit 10 is, for example, a liquid crystal display including a liquid crystal layer (e.g., transmissive liquid crystal layer) and a backlight as the means with light emission. Such a liquid crystal display displays the display image 11 by modulating intensity of light emitted from the backlight in regard to each pixel by using the liquid crystal layer. From the surface (display surface) of the liquid crystal display, a set of modulated rays of light is emitted as image light. The image display unit 10 may also be an image display device other than a liquid crystal display. For example, the image display unit 10 may also be an image display device of a self-luminous type such as a plasma display, an organic EL (ElectroLuminescence) display or an LED (Light-Emitting Diode) display. The image display unit 10 may also be made up of a screen as a display surface arranged at the position indicated as the display image 11 in FIG. 2 and a projector for projecting the image onto the screen. In this case, light is emitted from a light source of the projector, the image light is produced by modulating the emitted light according to the image signal, and the display image 11 is displayed on the screen by diffused reflection on the screen of the image light. The image display unit 10 displays the display image 11 based on the image signal $I_C$ outputted from the image control unit 20.

The beam splitter 12 is an optical element having a feature of splitting incident light into a transmitted light component and a reflected light component. The beam splitter 12 is a half mirror, for example. The half mirror is a mirror that splits the incident light so that the transmitted light component and the reflected light component are equal (or substantially equal) to each other in intensity. However, the transmitted light component and the reflected light component do not necessarily have to be equal in intensity; there can be a difference between intensity of the transmitted light component and that of the reflected light component. For example, the beam splitter 12 may be formed of a colorless and transparent glass plate or acrylic plate. In the case of the glass plate or acrylic plate, the intensity of the transmitted light component is higher than that of the reflected light component. Compared to the half mirror, the colorless and transparent glass plate or acrylic plate has a characteristic that an optical absorption rate is low. In the floating image display device 100, the use of an optical element having a low optical absorption rate as the beam splitter 12 has an effect of increasing luminance of the floating image 17.

As indicated by the optical paths 21 in FIG. 2 and FIG. 13, the retroreflective sheet 13 is a flat sheet-shaped optical element having a retroreflective function to reflect incident light directly towards a direction of incidence. Put another way, an optical path in a first direction as the traveling direction of the incident light and an optical path in a second direction as a traveling direction of retroreflected light are parallel (or substantially parallel) to each other and the first and second directions are opposite to each other. The optical path of the incident light in the first direction and the optical path of the retroreflected light in the second direction are desired to overlap each other. The optical element having the retroreflective function is referred to also as a retroreflector. The retroreflective sheet 13 as the optical element having the retroreflective function can be of a bead type made by closely arranging a plurality of small glass beads all over a mirror surface or of a microprism type made by closely arranging a plurality of small trigonal pyramids in concave shapes each of whose surfaces is formed as a mirror surface. Details of the configuration of such a retroreflective sheet 13 are described in Patent Document 2, for example. Retroreflective sheets are commonly used for traffic signs. Providing the surface of a traffic sign with the retroreflective function has an effect in that the sign illuminated with automobile headlights in the nighttime becomes easily viewable to the drivers. The retroreflective sheet 13 is desired to be fixed in a state of being stuck on a flat plate having rigidity or the like.

As shown in FIG. 2 and FIG. 13, the beam splitter 12 is arranged in a state of being inclined by 45 degrees (or substantially 45 degrees) with respect to the display surface of the image display unit 10. Meanwhile, the retroreflective sheet 13 is arranged in a state of being inclined by 90 degrees (or substantially 90 degrees) with respect to the display surface of the image display unit 10. With such an arrangement shown in FIG. 2 and FIG. 13, the beam splitter 12 and the retroreflective sheet 13 function as the floating-image-formation optical system in the floating image display device 100 and the display image 11 displayed on the display surface of the image display unit 10 is displayed as the floating image 17 at a position that is plane-symmetrical with respect to the beam splitter 12.

A principle for displaying the floating image 17 based on the display image 11 will be explained below. Out of the light (image light) emitted as the display image 11, light F0 entering the beam splitter 12 is split into a reflected light component F1 and a transmitted light component (not shown in FIG. 2 and FIG. 13). Of these, the reflected light component F1 is incident upon the retroreflective sheet 13, undergoes the retroreflection, and thereby returns to the beam splitter 12 as retroreflected light F3. The retroreflected light F3 returning to the beam splitter 12 is further split by the beam splitter 12 into a reflected light component (not shown in FIG. 2 and FIG. 13) and a transmitted light component F6. In FIG. 2 and FIG. 13, the optical paths 21 are indicated by broken lines. Incidentally, while the optical paths 21 are drawn so that the reflected light component F1 and the retroreflected light F3 at the beam splitter 12 do not overlap each other for the sake of easy understanding, the optical paths 21 of the reflected light component F1 and the retroreflected light F3 pass through the same point (or substantially the same point) on the beam splitter 12 in reality. While the optical path 21 in FIG. 2 indicates only the optical path of light traveling from the display image 11 in a direction orthogonal to the display surface of the image display unit 10, the display image 11 emits light in various directions from its surface like the three optical paths illustrated in FIG. 13 as an example. In optical paths of light entering the beam splitter 12 included in the light emitted in various directions as the display image 11, light emitted from a certain point on the display image 11 converges (reconverges) at a position that is plane-symmetrical with respect to the beam splitter 12. Since the reconverged light looks to be shining at the position at which the light reconverges to the viewer 16, the display image 11 is visually recognized as the floating image 17.

The positional relationship among the image display unit 10, the beam splitter 12 and the retroreflective sheet 13 shown in FIG. 2 and FIG. 13 illustrates a preferred example of the shapes and arrangement of these components. The installation positions and angles of the beam splitter 12 and the retroreflective sheet 13 with respect to the image display unit 10 can be changed as long as optical paths for the light from the display image 11 to reconverge at the positions plane-symmetrical with respect to the beam splitter 12 can be secured.

Figure 14:
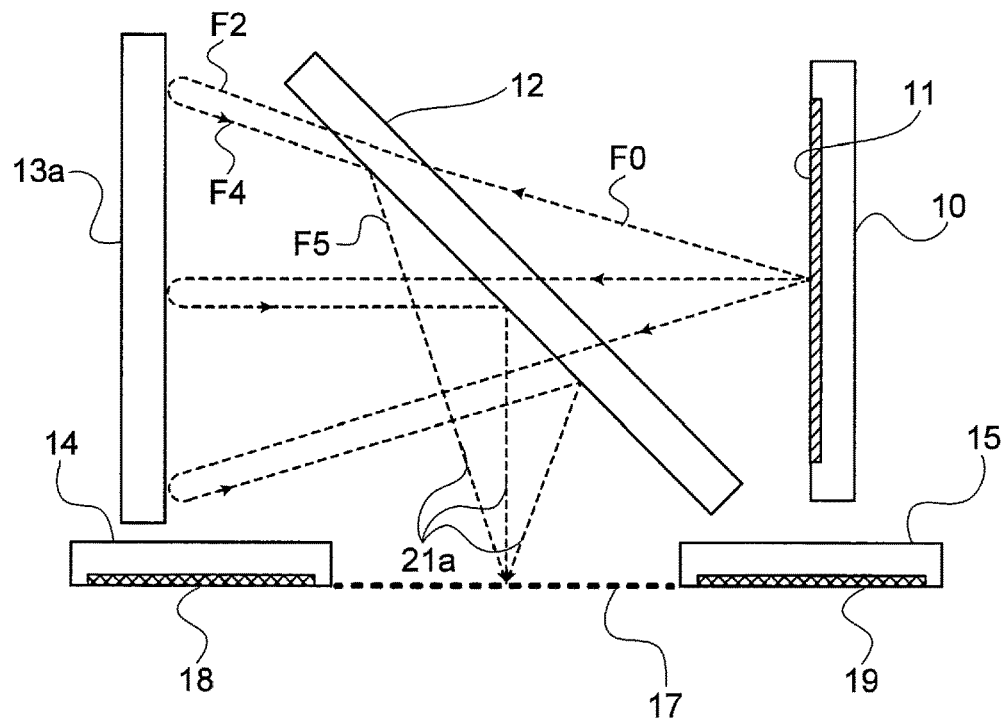
FIG. 14 is an enlarged top view showing another configuration of the optical system of the floating image display device and its principal optical paths.

FIG. 14 is an enlarged top view showing another configuration of the optical system of the floating image display device 100 and its principal optical paths. As shown in FIG. 14, a retroreflective sheet 13a may be set at a position where the distance from the image display unit 10 is longer than that of the beam splitter 12 and in a state of being in parallel with the display surface of the image display unit 10, for example. In this case, out of light F0 emitted as the display image 11, light F2 passing through the beam splitter 12 is retroreflected by the retroreflective sheet 13a. Out of light F4 which is retroreflected by the retroreflective sheet 13a and returns to the beam splitter 12, light F5 reflected by the beam splitter 12 (optical paths 21a) forms the floating image 17.

Figure 15:
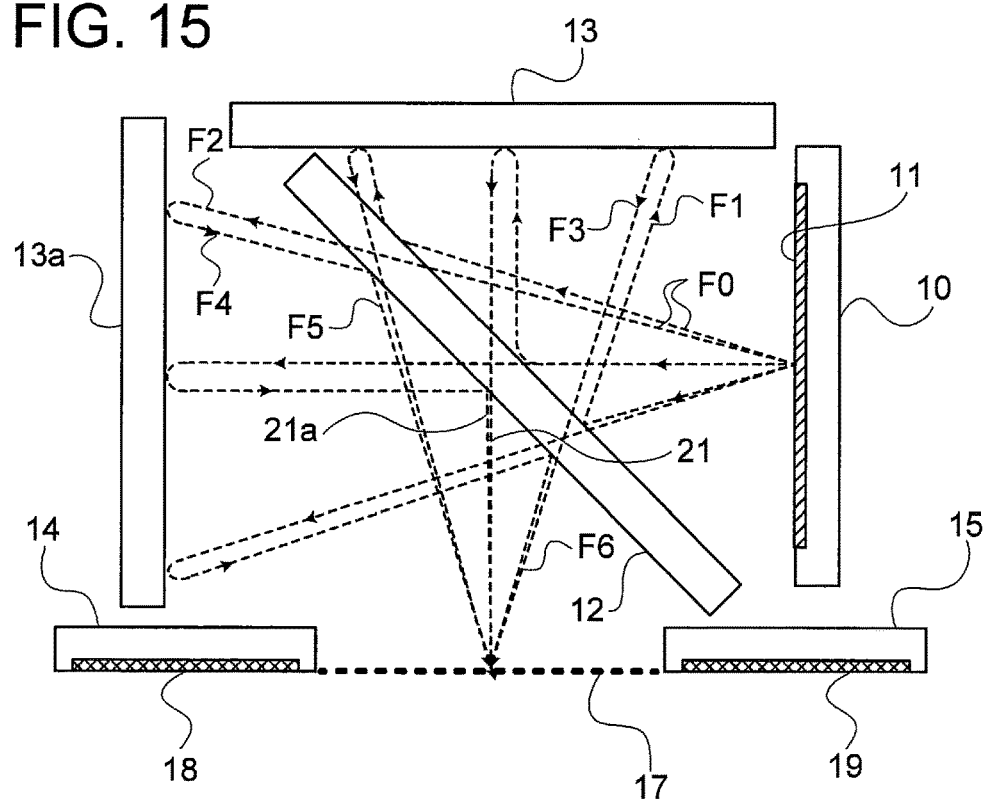
FIG. 15 is an enlarged top view showing still another configuration of the optical system of the floating image display device and its principal optical paths.

FIG. 15 is an enlarged top view showing still another configuration of the optical system of the floating image display device 100 and its principal optical paths. As shown in FIG. 15, the floating image display device 100 may include both the retroreflective sheet 13 in the state of being inclined by 90 degrees with respect to the display surface of the image display unit 10 and the retroreflective sheet 13a at the position where the distance from the image display unit 10 is longer than that of the beam splitter 12 and in the state of being in parallel with the display surface of the image display unit 10. In this case, the luminance of the floating image 17 increases since the floating image 17 is displayed with light of converging two optical paths.

The left guide image display unit 14 and the right guide image display unit 15 are devices for displaying images. The left guide image display unit 14 and the right guide image display unit 15 are liquid crystal displays, for example. The left guide image display unit 14 and the right guide image display unit 15 may also be display devices other than the liquid crystal displays. For example, the left guide image display unit 14 and the right guide image display unit 15 may be image display devices of other types such as the plasma displays, the organic EL displays or the LED displays. The left guide image display unit 14 may also be made up of a screen arranged at the position indicated as the left guide image display unit 14 in FIG. 2 and a projector for projecting an image onto the screen. Similarly, the right guide image display unit 15 may also be made up of a screen arranged at the position indicated as the right guide image display unit 15 in FIG. 2 and a projector for projecting an image onto the screen. The left guide image display unit 14 displays the left guide image 18 based on the image signal for the left guide image outputted from the image control unit 20. Similarly, the right guide image display unit 15 displays the right guide image 19 based on the image signal for the right guide image outputted from the image control unit 20.

As shown in FIG. 2 and FIG. 13, the left guide image display unit 14 and the right guide image display unit 15 are set so as to be situated respectively to the left and right of the floating image 17, and display the left guide image 18 and the right guide image 19 as the guide images at positions visually recognized to be on the same plane as the floating image 17 as viewed from the viewer 16. The viewer 16 can view the floating image 17, the left guide image 18 and the right guide image 19 at the same time.

If both the left guide image display unit 14 and the right guide image display unit 15 are absent, the viewer 16 views only the floating image 17. In our daily lives, it is easy for the viewer 16 to focus the eyes on an actual object; however, there are case where it is not easy for the viewer 16 to focus his/her own eyes on the floating image 17 since the floating image 17 is an image formed in the air where no actual object exists. If the viewer 16's eyes are focused on the beam splitter 12 as an actual object existing in the direction of the viewer 16's line of vision, the viewer 16 feels that the floating image 17 is displayed not in the air but on the beam splitter 12. Similarly, if the viewer 16's eyes are focused on the retroreflective sheet 13 as an actual object existing in the direction of the viewer 16's line of vision, the viewer 16 feels that the floating image 17 is displayed not in the air but on the retroreflective sheet 13.

In contrast, in the floating image display device 100 of the first embodiment, the display surfaces on which the left guide image 18 and the right guide image 19 are displayed are actual objects (actually existing objects), and thus the viewer 16 can easily focus the eyes on the left guide image 18 and the right guide image 19. The left guide image 18 and the right guide image 19 displayed on the same plane as the floating image 17 serve as a clue when the viewer 16 focuses the eyes on the floating image 17, and have effects of naturally guiding the viewer 16's eyes' focuses to the display position of the floating image 17 and making it easy for the viewer 16 to visually recognize the floating image 17 as an image existing at the correct display position (position in the depth direction, that is, the direction of the viewer's line of vision).

The image control unit 20 controls the images to be displayed by the image display unit 10, the left guide image display unit 14 and the right guide image display unit 15. In this embodiment, the image control unit 20 receives the image signals of the display image 11, the left guide image 18 and the right guide image 19 as input signals. The image control unit 20 outputs the inputted image signals respectively to the image display unit 10, the left guide image display unit 14 and the right guide image display unit 15. Incidentally, the image signals of the display image 11, the left guide image 18 and the right guide image 19 handled by the image control unit 20 may either be signals inputted from the outside or signals recorded in a storage unit of the image control unit 20. The storage unit is a semiconductor memory, a hard disk drive or the like, for example.

Figure 3:
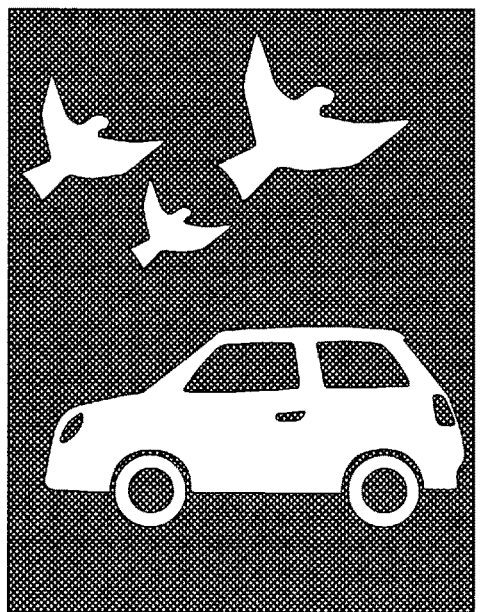
FIG. 3 is a diagram showing an example of an image displayed on an image display unit in the first embodiment.
Figure 4:
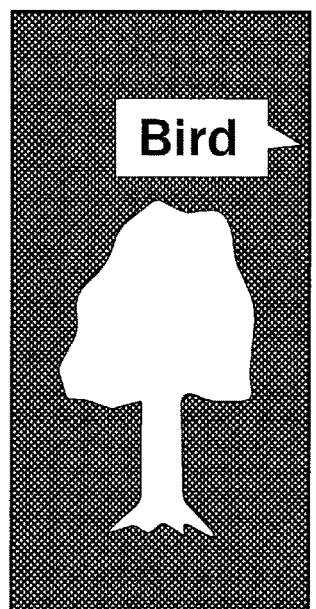
FIG. 4 is a diagram showing an example of a left guide image displayed on a left guide image display unit in the first embodiment.
Figure 5:
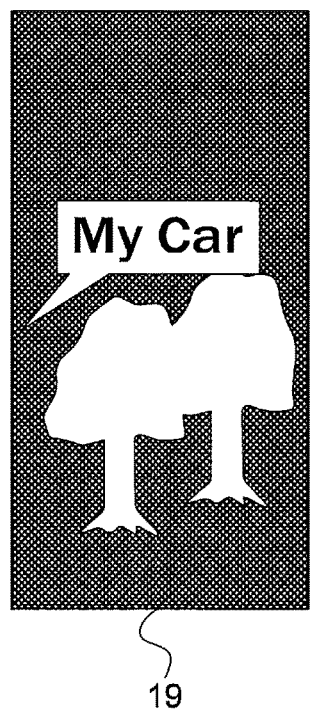
FIG. 5 is a diagram showing an example of a right guide image displayed on a right guide image display unit in the first embodiment.

FIG. 3 is a diagram showing an example of the display image 11 displayed on the image display unit 10. FIG. 4 is a diagram showing an example of the left guide image 18. FIG. 5 is a diagram showing an example of the right guide image 19.

Figure 6:
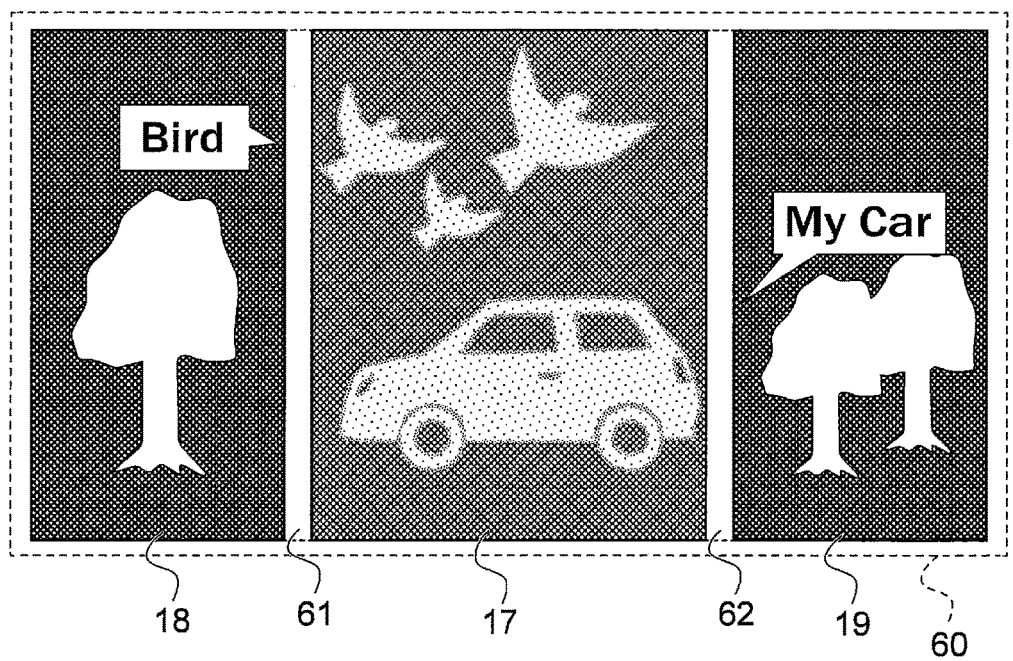
FIG. 6 is a diagram showing an example of an image visually recognized by a viewer in the first embodiment.

FIG. 6 is a diagram showing an image 60 visually recognized by the viewer 16 when the display image 11, the left guide image 18 and the right guide image 19 shown in FIGS. 3 to 5 are displayed by the floating image display device 100. As mentioned earlier, in the floating image display device 100, the display image 11 is displayed as the floating image 17. There is a gap 61 between the floating image 17 and the left guide image 18. Similarly, there is a gap 62 between the floating image 17 and the right guide image 19. These gaps 61 and 62, including frames around the display surfaces of the left guide image display unit 14 and the right guide image display unit 15, are regions where no image is displayed.

The left guide image 18 in FIG. 4 includes a balloon (e.g., "Bird") indicating contents of the display image 11. The right guide image 19 in FIG. 5 includes a balloon (e.g., "My Car") indicating the contents of the display image 11. By having the guide images include contents related to the contents displayed as the floating image as above, a sense of unity among the floating image and the guide images (the left guide image 18 and the right guide image 19) is enhanced. Accordingly, the viewer 16 feels that the floating image 17 is displayed at the same position in the depth direction as the guide images. Since the floating image 17 and the guide images are displayed so as to appear to be on the same plane, it becomes easy for the viewer 16 to visually recognize the floating image 17 at the correct display position.

As shown in FIG. 6, there are cases where the image seen by the viewer 16 as the floating image 17 undergoes blurring, a drop in luminance, a drop in contrast or the like in comparison with the display image 11. This is dependent on the performance of the floating-image-formation optical system and the length of the optical path through which the light of the display image 11 reconverges as the floating image 17.

A cause of the blurring of the floating image 17 is as follows: Light entering the beam splitter 12 is split into a transmitted light component and a reflected light component at the front surface of the beam splitter 12. The transmitted light component that passed through the inside of the beam splitter 12 is split again into a transmitted light component and a reflected light component at the back surface of the beam splitter 12 (surface opposite to the front surface). Thus, an optical path deviated from the optical path 21 by approximately the thickness of the beam splitter 12 is formed and the floating image 17 appears as a double image.

Another cause of the blurring of the floating image 17 is a deviation of the retroreflection direction in the retroreflective sheet 13. It is difficult for the retroreflective sheet 13 to reflect every ray of the incident light towards the direction of incidence and rays of light having slight angles from the direction of incidence are also caused by the reflection. These rays of light having slight angles from the direction of incidence converge around a reconvergence point to which the optical paths 21 reach, for example, and thereby the blurring of the floating image 17 occurs. This is also related with the length of the optical path through which the light of the display image 11 reconverges as the floating image 17. With increase in the length of the optical path, the reconvergence takes place in a larger region compared with the reconvergence point and the blurring of the floating image 17 increases.

A cause of the drop in the luminance of the floating image 17 is the splitting of the image light as the display image 11 in the beam splitter 12. The optical path 21 as one of the optical paths reconverging as the floating image 17 is incident upon the beam splitter 12 twice. Put another way, in FIG. 2, the optical path 21 uses the reflected light component F1 at the first entrance into the beam splitter 12 and uses the transmitted light component F6 at the second entrance. In FIG. 14, the optical path 21 uses the transmitted light component F2 at the first entrance into the beam splitter 12 and uses the reflected light component F5 at the second entrance. In these cases, one of the transmitted light component and the reflected light component does not reconverge as the floating image 17 (i.e., is not used for the displaying of the floating image 17). Due to the light component not reconverging, the luminance of the floating image 17 drops.

A cause of the drop in the contrast of the floating image 17 is the retroreflective sheet 13 existing as a background of the floating image 17 as viewed from the viewer 16. There exist retroreflective sheets 13 of various colors, among which those providing high intensity of the retroreflected light are white or silver. If such a bright color exists in the background of the floating image 17, the floating image 17 looks whitish, with lower contrast.

When the blurring, the drop in the luminance or the drop in the contrast occurs in the floating image 17 and a significant difference in visibility arises between the floating image 17 and the left and right guide images 18 and 19 displayed as the guide images, the effect of the guide images making it easy for the viewer 16 to visually recognize the floating image at the correct display position tends to diminish.

As a countermeasure against this problem, the image control unit 20 is desired to perform at least one of a process of adding the blurring to the left guide image 18 and the right guide image 19 to substantially the same level as the floating image 17, a luminance lowering process for making the left guide image 18 and the right guide image 19 have substantially the same level of luminance as the floating image 17, and a contrast lowering process for making the left guide image 18 and the right guide image 19 have substantially the same level of contrast as the floating image 17. By performing such processes and having the left guide image display unit 14 and the right guide image display unit 15 display the left guide image 18 and the right guide image 19 with at least one of substantially the same level of blurring as the floating image 17, substantially the same level of drop in the luminance as the floating image 17 and substantially the same level of drop in the contrast as the floating image 17, the sense of unity among the left guide image 18, the right guide image 19 and the floating image 17 is enhanced. The left guide image 18 and the right guide image 19 make it easy for the viewer 16 to visually recognize the floating image 17 at the correct display position.

Figure 16:
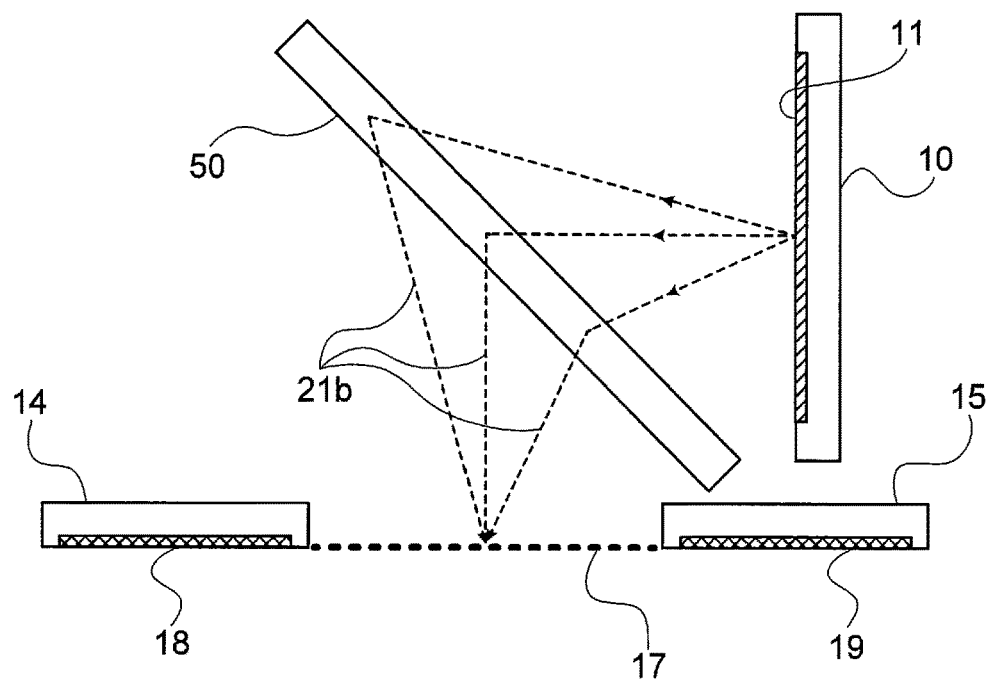
FIG. 16 is an enlarged top view showing yet another configuration of the optical system of the floating image display device and its principal optical paths.

FIG. 16 is an enlarged top view showing yet another configuration of the optical system of the floating image display device and its principal optical paths. In the above explanation, the beam splitter 12 and the retroreflective sheet 13 were used as the floating-image-formation optical system. However, it is possible as shown in FIG. 16 to display the display image 11 as the floating image 17 by employing a dihedral corner reflector array 50 arranged at the position of the beam splitter 12 as another floating-image-formation optical system instead of the beam splitter 12 and the retroreflective sheet 13. The dihedral corner reflector array 50 is formed by arranging multiple pairs of orthogonally intersecting mirror surfaces perpendicularly on a plane like an array. By having incident light reflected twice by the mirror surfaces, the incident light can be bent and transmitted in a direction plane-symmetrical with respect to the dihedral corner reflector array 50. Details of the configuration of such a dihedral corner reflector array 50 are described in Patent Document 1, for example. Also when the floating-image-formation optical system of FIG. 16 is employed, out of the light emitted in various directions as the display image 11, light bent by the dihedral corner reflector array 50 reconverges on the floating image 17, by which the display image 11 can be displayed as the floating image 17 in the same way. The effect of the left guide image 18 and the right guide image 19 does not change even when the floating-image-formation optical system implemented by the dihedral corner reflector array 50 is employed.

While the guide images are displayed to the left and right of the floating image 17 in this embodiment in order to make it easy for the viewer 16 to focus the eyes on the floating image 17 and visually recognize the display position of the floating image 17, display positions of the guide images are not limited to this example; the guide images may be displayed over and under the floating image 17.

It is also possible to display the guide images so as to surround the floating image 17.

Further, it is also possible to display only the floating image 17 and the left guide image 18, or to display only the floating image 17 and the right guide image 19. Similarly, it is also possible to display the guide image only over the floating image 17, or to display the guide image only under the floating image 17.

By displaying the guide image to appear to be on the same plane as the floating image 17 to the viewer 16 so as to facilitate the focusing and give a clue to the display position of the floating image 17, the effect explained in this embodiment is achieved.

Second Embodiment

In a second embodiment, a description will be given of a method for further increasing the visibility of the display position of the floating image 17 and enhancing the entertainment value of the floating image display device by unifying the display contents of the floating image 17 and the guide images.

Figure 7:
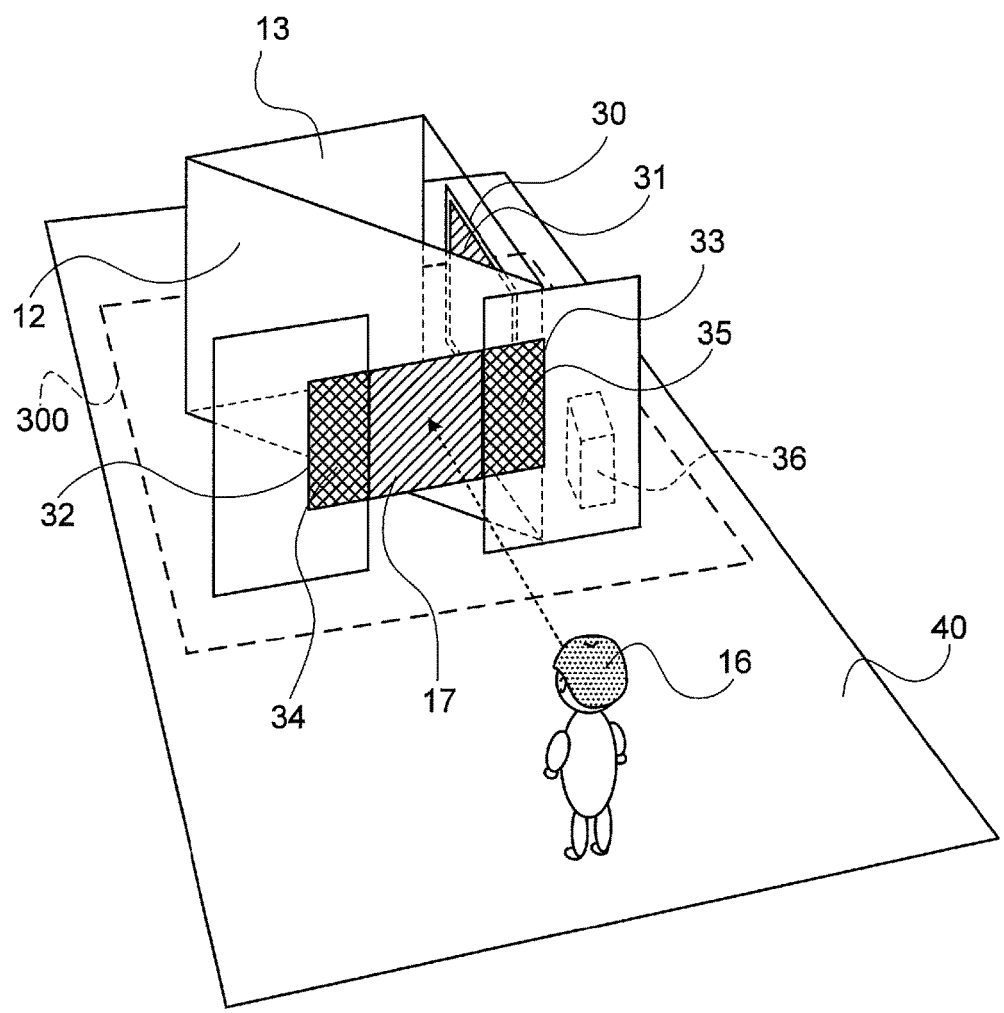
FIG. 7 is a bird's-eye view schematically showing the configuration of a floating image display device according to a second embodiment.

FIG. 7 is a bird's-eye view schematically showing the configuration of a floating image display device 300 according to the second embodiment. In FIG. 7, the floating image display device 300 includes an image display unit 30, a beam splitter 12, a retroreflective sheet 13, a left guide image display unit 32 and a right guide image display unit 33. These are components stood orthogonally to a floor surface 40 in the same way as in the first embodiment. The floating image display device 300 further includes an image division control unit 36 as an image control unit. An image 31 displayed on the image display unit 30 is displayed as a floating image 17 by a floating-image-formation optical system made up of the beam splitter 12 and the retroreflective sheet 13. On the left guide image display unit 32 situated to the left of the floating image 17 as viewed from the viewer 16, a left guide image 34 is displayed as a guide image. On the right guide image display unit 33 situated to the right of the floating image 17 as viewed from the viewer 16, a right guide image 35 is displayed as a guide image. The viewer 16 can view the floating image 17, the left guide image 34 and the right guide image 35 at the same time. The image division control unit 36 outputs an image signal of the image 31, an image signal of the left guide image 34 and an image signal of the right guide image 35 respectively to the image display unit 30, the left guide image display unit 32 and the right guide image display unit 33. In the following description, the configuration of the floating image display device 300 in the second embodiment will be described in detail. Incidentally, components of the floating image display device 300 in the second embodiment that are identical with those of the floating image display device 100 in the first embodiment are assigned the same reference characters as in the first embodiment and repeated explanation thereof is omitted.

The left guide image display unit 32 and the right guide image display unit 33, as devices for displaying images, are characterized in having no frames around their display surfaces. For example, displaying an image with no frame is possible by setting a screen at the position of the left guide image display unit 32 and projecting the image onto the screen by using a projector provided separately. Besides, liquid crystal displays the frame width of which has been reduced to zero by including gate drivers for driving the liquid crystal panel in pixels, modular LED displays or the like are also devices capable of displaying an image with no frame. The right guide image display unit 33 can be configured similarly to the left guide image display unit 32.

The left guide image display unit 32 is set so as to be situated to the left of the floating image 17 as viewed from the viewer 16, and displays the left guide image 34 as the guide image at a position visually recognized to be on the same plane as the floating image 17 as viewed from the viewer 16. The right guide image display unit 33 is set so as to be situated to the right of the floating image 17 as viewed from the viewer 16, and displays the right guide image 35 as the guide image at a position visually recognized to be on the same plane as the floating image 17 as viewed from the viewer 16. The arrangement in the floating image display device 300 is made so that there is no gap between the left guide image 34 and the floating image 17. Similarly, the arrangement in the floating image display device 300 is made so that there is no gap between the right guide image 35 and the floating image 17. With such an arrangement, the viewer 16 can view the left guide image 34, the floating image 17 and the right guide image 35 arranged in order from the left in a state where adjoining images are connected seamlessly with each other.

Figure 8:
FIG. 8 is a diagram showing an example of an image based on an image signal inputted to an image division control unit in the second embodiment.

The image division control unit 36 controls the images displayed on the image display unit 30, the left guide image display unit 32 and the right guide image display unit 33 of the floating image display device 300. In this embodiment, the image division control unit 36 accepts one image signal as an input. An example of the image contents of the inputted image signal is shown in FIG. 8.

Figure 9:
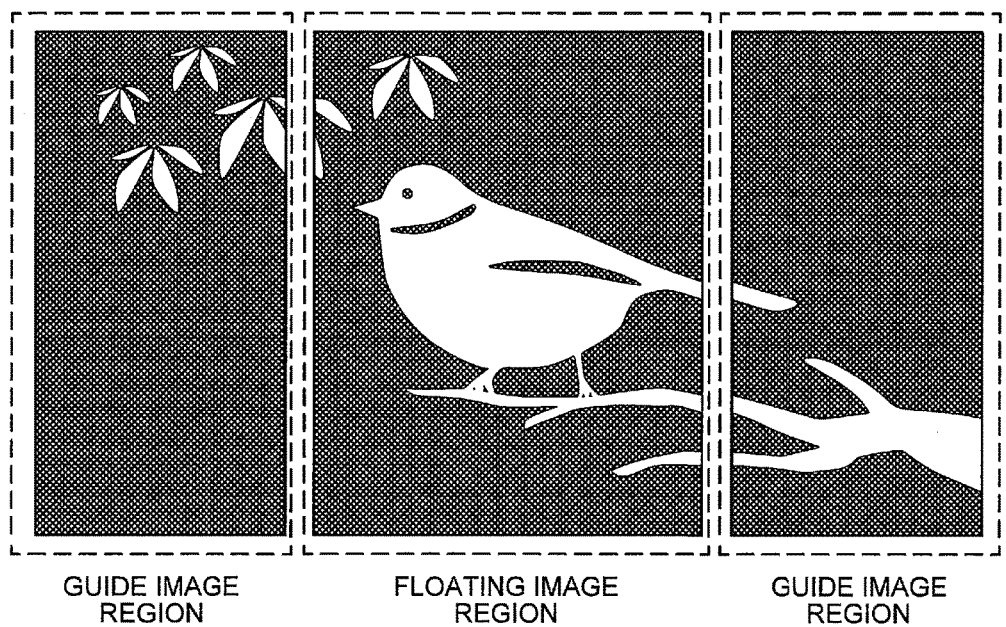
FIG. 9 is a diagram showing an example of divisional images obtained by dividing the image based on the image signal inputted to the image division control unit in the second embodiment.

The image division control unit 36 divides the inputted image signal into a region to be displayed as the floating image 17 and regions to be displayed as the guide images. In this embodiment, there exist two guide images: the left guide image 34 and the right guide image 35, and thus the inputted image signal is divided into a total of three regions. An example of the image contents of the divided image signals is shown in FIG. 9. Put another way, from an image signal of an entire image made up of the image 31 to be displayed by the image display unit 30 and the guide images (the left guide image 34 and the right guide image 35) to be displayed by the guide image display units (the left guide image display unit 32 and the right guide image display unit 33), the image division control unit 36 as the image control unit generates a first divisional image signal for making the image display unit 30 display the image 31 and second divisional image signals (the image signal of the left guide image 34 and the image signal of the right guide image 35) for making the guide image display units (the left guide image display unit 32 and the right guide image display unit 33) display the guide images.

Subsequently, the image division control unit 36 performs at least one of the process of adding substantially the same level of blurring as the floating image 17, the process of lowering the luminance to substantially the same level as the floating image 17 and the process of lowering the contrast to substantially the same level as the floating image 17 on the image signals divided as the guide images. There are cases where, in the floating image 17, at least one of the blurring, the drop in the luminance and the drop in the contrast occurs in the floating-image-formation optical system. Those processes are performed in order to display the guide images with substantially the same level of blurring, drop in the luminance or drop in the contrast as that of the floating image 17. Incidentally, while it is desirable to perform all of the process of adding the blurring, the process of lowering the luminance and the process of lowering the contrast, it is also possible to perform one or two of the processes in consideration of a resource such as a processing circuit for conducting the image processing. In cases where the performance of the floating-image-formation optical system is high and the blurring, the drop in the luminance or the drop in the contrast occurring in the floating image 17 is within a permissible range, the image division control unit 36 may skip (leave out) the process of adding the blurring, lowering the luminance or lowering the contrast. Put another way, the image division control unit 36 may perform the process of adding the blurring to the guide images when the level of the blurring of the floating image 17 exceeds a preset reference blurring amount (upper limit of the permissible range of the blurring). The image division control unit 36 may perform the process of lowering the luminance of the guide images when the luminance of the floating image 17 is lower than or equal to a preset reference luminance value (lower limit of a permissible range of the luminance). The image division control unit 36 may perform the process of lowering the contrast of the guide images when the contrast of the floating image 17 is lower than or equal to a preset reference contrast (lower limit of a permissible range of the contrast). Whether the blurring, the luminance or the contrast is within the permissible range or not may be switched on the basis of result of measurement by a measuring instrument or on the basis of a setting operation performed by the manufacturer or the user. The adjustment for displaying the guide images with substantially the same level of blurring, drop in the luminance or drop in the contrast as that of the floating image 17 can also be made manually by the manufacturer or the user while he/she is viewing the images. Incidentally, such control may also be conducted in the floating image display device 100 of the first embodiment.

The image division control unit 36 outputs the image signal for the region to be displayed as the floating image 17 to the image display unit 30, while outputting image signals, obtained by performing at least one of the process of adding the blurring, the process of lowering the luminance and the process of lowering the contrast on the image signals for the regions to be displayed as the guide images, to the left guide image display unit 32 and the right guide image display unit 33.

Figure 10:
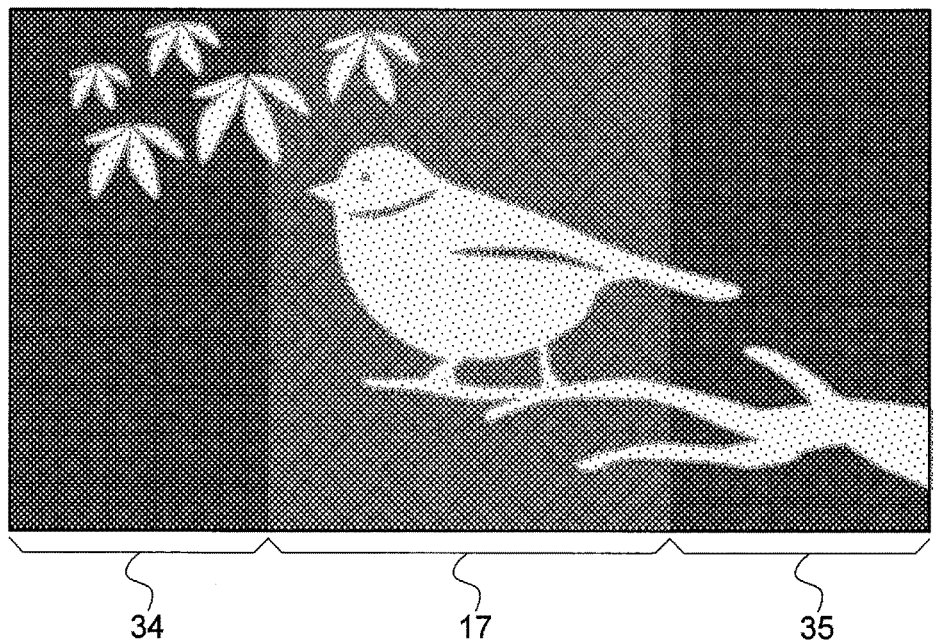
FIG. 10 is a diagram schematically showing an example of a combination of a floating image, a left guide image and a right guide image visually recognized by the viewer in the second embodiment.

FIG. 10 shows an example of the floating image 17, the left guide image 34 and the right guide image 35 visually recognized by the viewer 16 in this embodiment. As shown in FIG. 10, tail feathers of a bird and branches of a tree are displayed so as to straddle the boundary between the floating image 17 and the right guide image 35. Further, leaves of a tree are displayed so as to straddle the boundary between the floating image 17 and the left guide image 34. As above, the viewer 16 can view an image in which the floating image 17 and the guide images are seamlessly connected on the same plane and unified.

Since the floating image 17 and the guide images are seamlessly connected on the same plane and appear as the unified image, it becomes easier for the viewer 16 to feel that the floating image 17 is displayed at the same depth as the guide images which are easy to focus on, and the effect of the guide images increasing the visibility of the floating image 17 can be enhanced.

Further, the displaying of the unified image makes it possible to display an image of a wider angle of field and of a larger size than the floating image 17 and thereby enhance the entertainment value of the floating image display device.

Modification

While the first and second embodiments of this specification have described the configurations in which the image display unit and the floating-image-formation optical system are arranged in a state of being stood orthogonally with respect to the floor surface 40, the present invention is effective also for other arrangements. The other arrangements include a table-type arrangement, for example. An example of the table-type arrangement is shown in FIG. 11.

Figure 11:
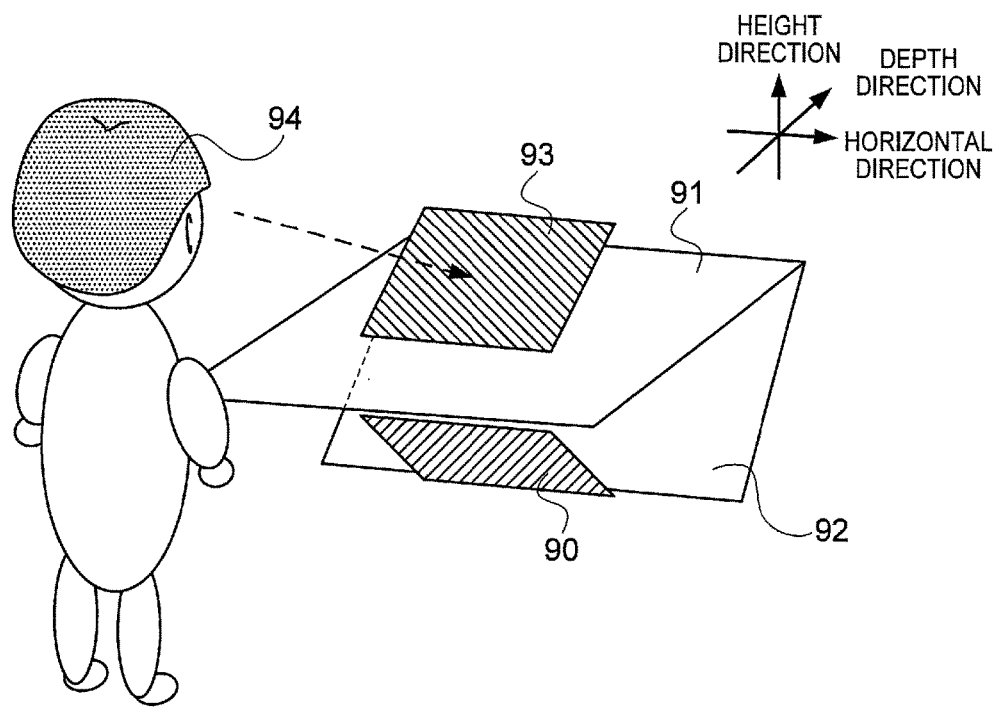
FIG. 11 is a diagram showing an arrangement of an image display unit and a floating-image-formation optical system of a floating image display device according to a modification of the first and second embodiments.

In FIG. 11, a beam splitter 91 is set in parallel with the floor surface, and a display surface of a tilted image display unit 90 and a retroreflective sheet 92 are arranged so as to oppose each other under the beam splitter 91. In the case of this arrangement, an image displayed on the image display unit 90 appears as a floating image 93 over the beam splitter 91.

Figure 17:
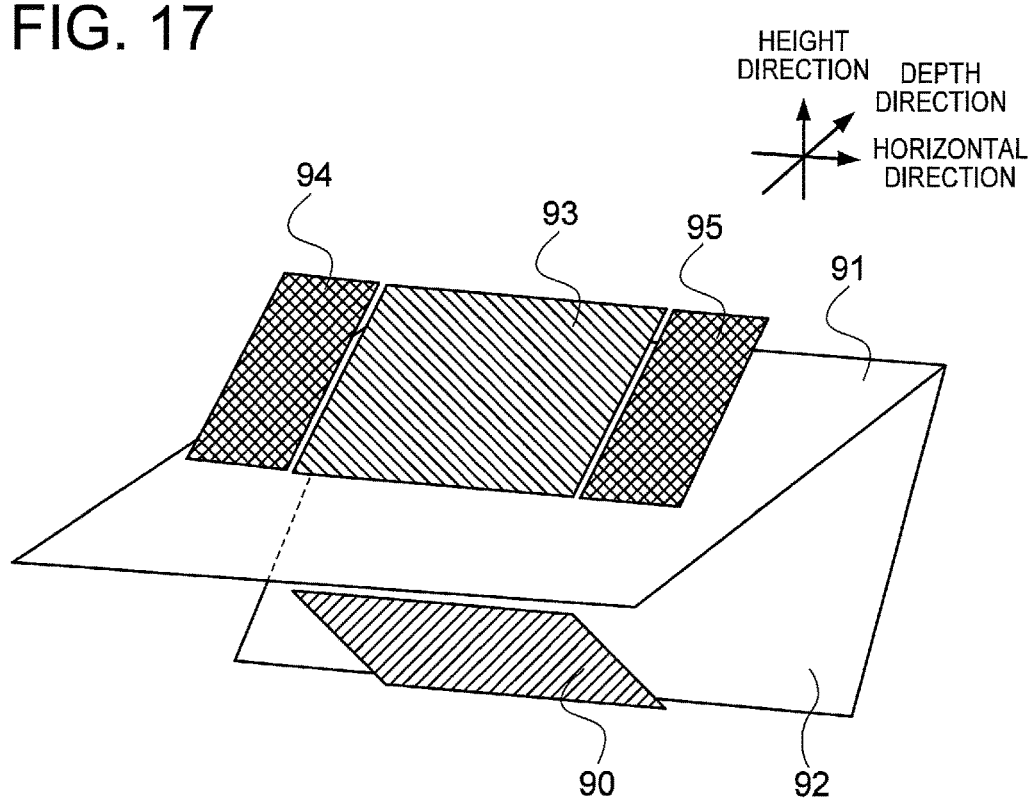
FIG. 17 is an enlarged view showing the details of the floating image display device of FIG. 11.

FIG. 17 is an enlarged view showing the details of the floating image display device of FIG. 11. Also in the arrangement of the image display unit 90 and the floating-image-formation optical system (the beam splitter 91 and the retroreflective sheet 92) shown in FIG. 11, effects equivalent to those explained in the above first and second embodiments can be obtained by displaying guide images 95 and 96 nearby (or around) the floating image 93 to appear to be on the same plane as the floating image 93 as viewed from a viewer 94.

DESCRIPTION OF REFERENCE CHARACTERS

10: image display unit, 11: image, 12: beam splitter, 13: retroreflective sheet, 14: left guide image display unit, 15: right guide image display unit, 16: viewer, 17: floating image, 18: left guide image, 19: right guide image, 20: image control unit, 21: optical path, 30: image display unit, 31: image, 32: left guide image display unit, 33: right guide image display unit, 34: left guide image, 35: right guide image, 36: image division control unit (image control unit), 40: floor surface, 60: image, 61: gap, 62: gap, 90: image display unit, 91: beam splitter, 92: retroreflective sheet, 93: floating image, 94: viewer, 95, 96: guide image, 100: floating image display device, 300: floating image display device.

What is claimed is:

1. A floating image display device comprising:
   an image display unit that displays a display image based on a first image signal;
   a floating-image-formation optical system that forms an image in air as a floating image from the display image;
   a guide image display unit that displays two guide images based on a second image signal on the left and on the right of the floating image so that the guide images is visually recognized on a same plane as the floating image as viewed from a viewer; and
   an image control unit that supplies the first image signal to the image display unit and supplies the second image signal to the guide image display unit,
   wherein the image control unit supplies an image signal as the second image signal to the guide image display unit after the image signal undergoes at least one of a process of adding substantially a same level of blurring as blurring of the floating image to the guide images, a process of lowering luminance to substantially a same level as luminance of the floating image and a process of lowering contrast to substantially a same level as contrast of the floating image.

2. The floating image display device according to claim 1, wherein the image control unit supplies an image signal as the second image signal to the guide image display unit after the image signal undergoes the process of adding substantially a same level of blurring as blurring of the floating image to the guide images, the process of lowering luminance to substantially a same level as luminance of the floating image and the process of lowering contrast to substantially a same level as contrast of the floating image.

3. The floating image display device according to claim 1, wherein the floating-image-formation optical system includes:
   a beam splitter that splits image light emitted from the display image displayed on the image display unit into a reflected light component and a transmitted light component; and
   a retroreflective sheet that receives the reflected light component obtained by the splitting by the beam splitter, the reflected light component being incident in a first direction, the retroreflective sheet reflecting the reflected light component directly in a direction opposite to the first direction.

4. The floating image display device according to claim 1, wherein the floating-image-formation optical system includes:
   a beam splitter that splits image light emitted from the display image displayed on the image display unit into a reflected light component and a transmitted light component; and
   a retroreflective sheet that receives the transmitted light component obtained by the splitting by the beam splitter, the transmitted light component being incident in a first direction, the retroreflective sheet reflecting the transmitted light component directly in a direction opposite to the first direction.

5. The floating image display device according to claim 3, wherein the floating-image-formation optical system further includes another retroreflective sheet that receives the transmitted light component obtained by the splitting by the beam splitter, the transmitted light component being incident in a second direction, the another retroreflective sheet reflecting the transmitted light component directly in a direction opposite to the second direction.

6. The floating image display device according to claim 1, wherein the floating-image-formation optical system includes a dihedral corner reflector array that causes image light emitted from the display image displayed on the image display unit to form the image in the air.

7. The floating image display device according to claim 1, wherein the guide images displayed by the guide image display unit is arranged so as to be in contact with a position where the floating image is formed.

8. The floating image display device according to claim 1, wherein the image control unit generates a first divisional image signal for making the image display unit display the display image and a second divisional image signal for making the guide image display unit display the guide images from an image signal of an entire image made up of the display image to be displayed by the image display unit and the guide images to be displayed by the guide image display unit.

* * * * *